US012746919B2

(12) United States Patent
Kim et al.

(10) Patent No.: US 12,746,919 B2
(45) Date of Patent: Sep. 29, 2026

(54) VEHICLE AND ACCELERATION LIMIT CONTROL METHOD THEREOF

(71) Applicants: Hyundai Motor Company, Seoul (KR); Kia Corporation, Seoul (KR)

(72) Inventors: Do Hwa Kim, Hwaseong-si (KR); Seong Wook Moon, Hwaseong-si (KR); Hui Un Son, Hwaseong-si (KR); Gyu Ri Lee, Hwaseong-si (KR); Sung Il Jung, Hwaseong-si (KR); Jae Young Park, Hwaseong-si (KR); Jeong Eun Kim, Hwaseong-si (KR); Sung Bae Jeon, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 20 days.

(21) Appl. No.: 19/079,113

(22) Filed: Mar. 13, 2025

(65) Prior Publication Data

US 2025/0206306 A1 Jun. 26, 2025

Related U.S. Application Data

(63) Continuation of application No. 18/099,179, filed on Jan. 19, 2023, now Pat. No. 12,275,402.

(30) Foreign Application Priority Data

Jul. 26, 2022 (KR) ........................ 10-2022-0092619

(51) Int. Cl.
*B60W 30/14* (2006.01)
*B60W 40/09* (2012.01)
(Continued)

(52) U.S. Cl.
CPC .......... *B60W 30/146* (2013.01); *B60W 40/09* (2013.01); *B60W 40/105* (2013.01);
(Continued)

(58) Field of Classification Search
CPC .. B60W 30/146; B60W 40/09; B60W 40/105; B60W 40/107; B60W 50/14
See application file for complete search history.

(56) References Cited

U.S. PATENT DOCUMENTS 5,527,232 A 6/1996 Seidel et al.
8,510,200 B2 * 8/2013 Pearlman ................ H04Q 9/00 705/36 R
(Continued)

FOREIGN PATENT DOCUMENTS

JP 2008-186045 A 8/2008
JP 2010-205082 A 9/2010
(Continued)

*Primary Examiner* — Ramsey Refai
(74) *Attorney, Agent, or Firm* — MORGAN, LEWIS & BOCKIUS LLP

(57) ABSTRACT

A vehicle and an acceleration limit control method thereof, includes obtaining a driving score of a driver, determining a driving score change amount of the driver based on traveling information measured or generated when the vehicle is driving, determining a current driving score based on the determined change amount of the driving score and the obtained driving score, and setting an acceleration limit level or changing a preset acceleration limit level based on the determined current driving score.

16 Claims, 5 Drawing Sheets

(51) Int. Cl.
*B60W 40/105* (2012.01)
*B60W 40/107* (2012.01)
*B60W 50/14* (2020.01)
*B60W 50/00* (2006.01)

(52) U.S. Cl.
CPC .......... *B60W 40/107* (2013.01); *B60W 50/14* (2013.01); *B60W 2050/0083* (2013.01); *B60W 2050/146* (2013.01); *B60W 2510/0661* (2013.01); *B60W 2520/105* (2013.01); *B60W 2540/106* (2013.01); *B60W 2540/12* (2013.01); *B60W 2540/18* (2013.01); *B60W 2554/802* (2020.02); *B60W 2556/10* (2020.02); *B60W 2720/106* (2013.01)

(56) References Cited

U.S. PATENT DOCUMENTS

| | | | | |
|---|---|---|---|---|
| 9,884,630 | B1 * | 2/2018 | Ross | G07C 5/0808 |
| 9,956,957 | B2 | 5/2018 | Steinmeyer | |
| 10,783,725 | B1 * | 9/2020 | Gaudin | B60W 40/09 |
| 11,989,749 | B2 * | 5/2024 | Scholl | B60K 35/85 |
| 2008/0068218 | A1 * | 3/2008 | Lawson | G08G 1/096783 340/905 |
| 2010/0222939 | A1 * | 9/2010 | Namburu | B60R 16/037 701/1 |
| 2013/0141249 | A1 * | 6/2013 | Pearlman | H04Q 9/00 340/870.03 |
| 2015/0039175 | A1 * | 2/2015 | Martin | G06Q 40/08 701/31.5 |
| 2017/0032673 | A1 * | 2/2017 | Scofield | A61B 5/02055 |
| 2021/0164792 | A1 * | 6/2021 | Pal | G01C 21/3453 |
| 2022/0089160 | A1 | 3/2022 | Son et al. | |
| 2022/0185338 | A1 * | 6/2022 | Stenneth | B60W 60/0055 |

FOREIGN PATENT DOCUMENTS

| | | | |
|---|---|---|---|
| KR | 10-0436524 | B1 | 6/2004 |
| KR | 10-1405785 | B1 | 6/2014 |
| KR | 10-2022-0040102 | A | 3/2022 |

* cited by examiner

VEHICLE AND ACCELERATION LIMIT CONTROL METHOD THEREOF

CROSS REFERENCE TO RELATED APPLICATION

The present application is a continuation of U.S. patent application Ser. No. 18/099,179, filed Jan. 19, 2023, which claims priority to Korean Patent Application No. 10-2022-0092619, filed on Jul. 26, 2022, the entire contents of which is incorporated herein for all purposes by this reference.

BACKGROUND OF THE PRESENT DISCLOSURE

Field of the Present Disclosure

The present disclosure relates to a vehicle and an acceleration limit control method thereof which is capable of improving driving convenience of an inexperienced beginner driver in such a way of measuring driver's driving score, when the driver is driving the vehicle, and setting an acceleration limit level based thereon.

Description of Related Art

The speed limiting device refers to a driving safety system that limits acceleration so that the driving speed does not exceed the speed limit set by the driver for preventing overspeed in advance. A typical example of a speed limiting device is a manual speed limit assist (MSLA) function. A typical example of a speed limiting device is a manual speed limit assist (MSLA) function.

Typically, the MSLA function does not control braking for deceleration, and this may cause accelerating to exceed the set speed on downhill roads, which means that the driver may keep an eye on the forward situation because it does not consider the relative position/speed of the vehicle ahead unlike Smart Cruise Control (SCC).

However, it is necessary to provide the above-described vehicle speed limit function in consideration of acceleration. For example, the Automatically Commanded Steering Function (ACSF) regulation requires the lateral acceleration to be controlled within 3 m/sˆ2 during autonomous driving or cruise control driving. Such an acceleration limiting function may limit the acceleration at the time of acceleration and deceleration of the vehicle during autonomous driving or cruise control driving to a preset acceleration, facilitating the vehicle to travel safely and smoothly.

However, because the general acceleration limiting method applies a fixed acceleration limit value, it is impossible to change the acceleration limit setting according to the driving behavior of the driver. For example, it is likely for a beginner driver to want a more restrictive acceleration limit for safety before becoming skilled while an experienced driver feels an insufficient acceleration feeling with such acceleration limit.

Therefore, there is a demand for a method for determining the driver's driving behavior behind the wheel and lowering the acceleration limit when it is determined that the driver's driving behavior is good.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle and an acceleration limit control method thereof which is configured for determining change amount in driving score according to the driver's driving behavior and changing the acceleration level based on the current driving score, providing a smooth acceleration feeling and improved driving experience to the driver.

The technical objects of the present disclosure are not limited to the aforesaid, and other objects not described herein with be clearly understood by those skilled in the art from the descriptions below.

In various aspects of the present disclosure, there is provided a method for controlling an acceleration limit of a vehicle including obtaining a driving score of a driver, determining a driving score change amount of the driver based on traveling information measured or generated when the vehicle is driving, determining a current driving score based on the determined change amount of the driving score and the obtained driving score, and setting an acceleration limit level or changing a preset acceleration limit level based on the determined current driving score.

According to an exemplary embodiment of the present disclosure, obtaining the driving score may include retrieving the driving score of the driver which is determined last before starting current driving of the vehicle.

According to an exemplary embodiment of the present disclosure, the traveling information may include at least one of vehicle speed information, regulation speed information, front vehicle distance information, Accelerator Pedal Sensor (APS) information, Brake Pedal Sensor (BPS) information, Steering Angle Sensor (SAS) information, and torque amount information limited by acceleration limit.

According to an exemplary embodiment of the present disclosure, the acceleration limit control method may further include displaying a notification of the driving score change amount to the driver.

According to an exemplary embodiment of the present disclosure, determining the driving score may include determining the current driving score by summing the determined driving score change amount and the obtained driving score.

According to an exemplary embodiment of the present disclosure, the acceleration limit level may be divided into driving score ranges by level.

According to an exemplary embodiment of the present disclosure, changing the preset acceleration limit level may include changing, when the determined current driving score is greater than a driving score of the preset acceleration limit level, the acceleration limit level to decrease.

According to an exemplary embodiment of the present disclosure, changing the preset acceleration limit level may include changing, when the determined driving score change amount is greater than a driving score range of the preset acceleration limit level, by determining the acceleration limit level.

According to an exemplary embodiment of the present disclosure, the acceleration limit control method may According to an exemplary embodiment of the present disclosure, the acceleration limit control method may further include storing the determined current driving score of the driver after driving of the vehicle ends.

According to an exemplary embodiment of the present disclosure, setting the acceleration limit level may include setting the acceleration level to limit acceleration of the vehicle by pedal operation of the driver in a stepwise manner.

Furthermore, the vehicle according to various exemplary embodiments of the present disclosure may include a driving score recognition unit of obtaining a driving score of a driver, a driving score calculation unit of determining a driving score change amount of the driver based on traveling information measured or generated when the vehicle is driving, a driving score determining unit configured for determining a current driving score based on the determined change amount of the driving score and the obtained driving score, and an acceleration limit setting unit of setting an acceleration limit level or changing a preset acceleration limit level based on the determined current driving score.

According to an exemplary embodiment of the present disclosure, the vehicle may further include a driving score notification unit configured for displaying a notification of the driving score change amount to the driver.

According to an exemplary embodiment of the present disclosure, the driving score determining unit may compute the current driving score by summing the determined driving score change amount and the obtained driving score.

According to an exemplary embodiment of the present disclosure, the acceleration limit setting unit may change, when the determined current driving score is greater than a driving score of the preset acceleration limit level, the acceleration limit level to decrease.

According to an exemplary embodiment of the present disclosure, the acceleration limit setting unit may perform changing, when the determined driving score change amount is greater than a driving score range of the preset acceleration limit level, by determining the acceleration limit level.

According to an exemplary embodiment of the present disclosure, the vehicle may further include a driving score storage unit for storing the determined current driving score of the driver after driving of the vehicle ends.

According to an exemplary embodiment of the present disclosure, the acceleration limit setting unit may set the acceleration limit level to limit acceleration of the vehicle by pedal operation of the driver in a stepwise manner.

The vehicle and an acceleration limit control method thereof according to an exemplary embodiment of the present disclosure is advantageous in terms of providing a smooth feeling of acceleration and facilitating the driver to enjoy more improved driving in such a way of determining the driving score hang amount based on the driver's driving behavior and changing the acceleration limit level based on the current driving score.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
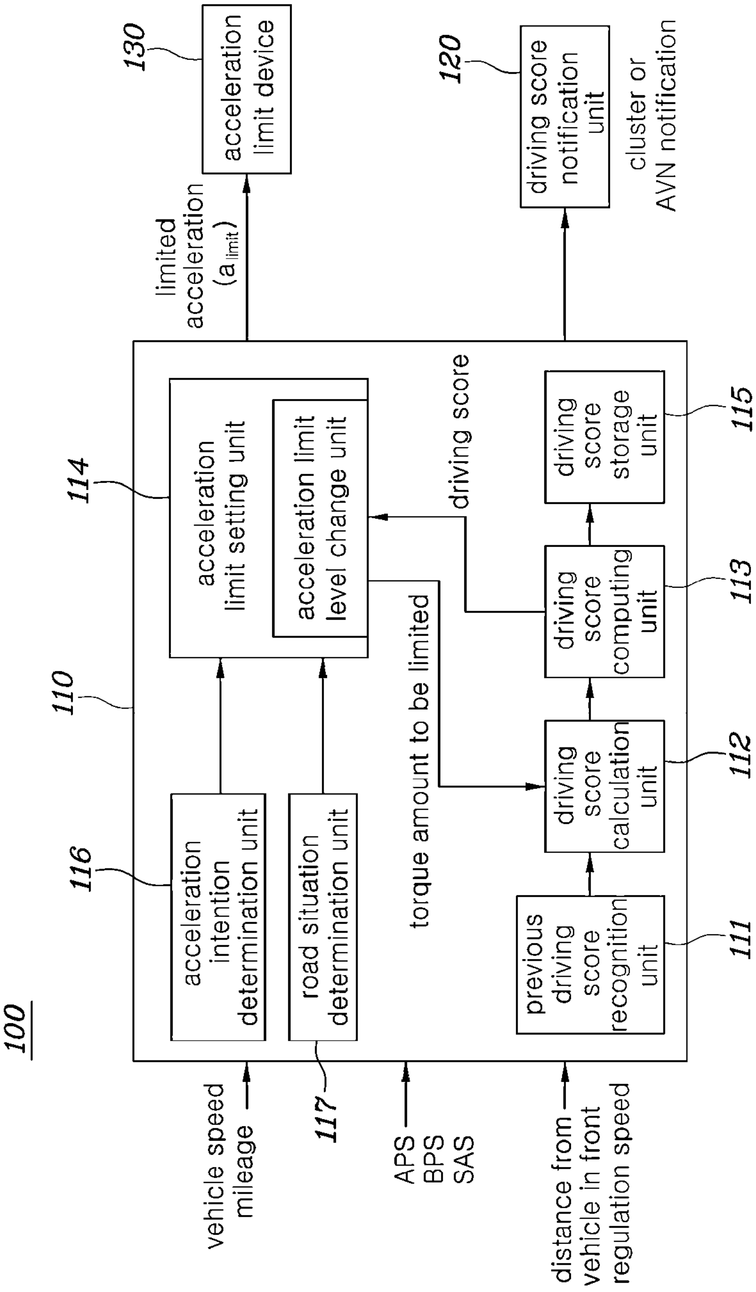
FIG. 1 is a block diagram illustrating a configuration of an acceleration limit control method of a vehicle according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, descriptions include the exemplary embodiments included in the present specification with reference to the accompanying drawings in which the same reference numbers are assigned to refer to the same or like components and redundant description thereof is omitted. As used in the following description, the suffix "module" and "unit" are granted or used interchangeably in consideration of easiness of description but, by itself, having no distinct meaning or role. Furthermore, in describing the exemplary embodiments included in the present specification, if it is determined that detailed descriptions of related known technologies may obscure the gist of the exemplary embodiments included in the present specification, the detailed description thereof will be omitted. Furthermore, detailed descriptions of well-known technologies related to the exemplary embodiments included in the present specification may be omitted to avoid obscuring the subject matter of the exemplary embodiments included in the present specification.

As used herein, terms including an ordinal number such as "first" and "second" may be used to describe various components without limiting the components. The terms are used only for distinguishing one component from another component.

It will be understood that when a component is referred to as being "connected to" or "coupled to" another component, it may be directly connected or coupled to the other component or intervening component may be present. In contrast, when a component is referred to as being "directly connected to" or "directly coupled to" another component, there are no intervening component present.

As used herein, the singular forms are intended to include the plural forms as well, unless the context clearly indicates otherwise.

It will be further understood that the terms "comprises" or "has," when used in the present specification, specify the presence of a stated feature, number, step, operation, component, element, or a combination thereof, but they do not preclude the presence or addition of one or more other features, numbers, steps, operations, components, elements, or combinations thereof.

Furthermore, a unit or control unit included in the names of a Hybrid Control Unit (HCU), a Vehicle Control Unit (VCU), etc. is only a term in use widely for designating a controller that is configured to control a specific functions of a vehicle but does not means a generic function unit. For example, each controller may include a communication device communicating with another controller or sensor to control a function in charge, a memory that stores operating system or logic instructions and input/output information, and one or more processors for determination, operation, and decision-making necessary for functions in charge.

According to various exemplary embodiments of the present disclosure, it is provided to determine a driving score of a driver based on the information of a vehicle and acceleration limiting device and change the acceleration limit level, when requested, according to the driving score to provide a smooth acceleration feeling to the driver.

FIG. 1 is a block diagram illustrating a configuration of an acceleration limit control method of a vehicle according to various exemplary embodiments of the present disclosure. FIG. 1 mainly shows components related to the exemplary embodiment and it is obvious to be able to include fewer or more components in an actual implementation.

With reference to FIG. 1, a vehicle 100 according to various exemplary embodiments of the present disclosure may include an acceleration limit device, a driving score recognition unit 111, a driving score calculation unit 112, a driving score determining unit 113, an acceleration limit setting unit 114, a driving score storage unit 115, an acceleration intention determination unit 116, a road situation determination unit 117, and a driving score notification unit 120.

Here, the driving score recognition unit 111, the driving score calculation unit 112, the driving score determining unit 113, the driving score storage unit 115, the acceleration intention determination unit 116, and the road situation determination unit 117 may be included in a VCU. The VCU may receive traveling information measured or generated while the vehicle is traveling and output limited acceleration ($a_{limit}$), according to the acceleration limit level set or changed at the acceleration limit setting unit 114, to actually limit acceleration by the acceleration limit device 130. The driving score notification unit 120 may also receive the determined driving score change amount from the VCU and display it to the driver in a form of a notification, which will be described later.

In an exemplary embodiment of the present disclosure, because the acceleration limit method of the acceleration limit device 130 limits the acceleration of the vehicle to the limited acceleration ($a_{limit}$), no torque correction occurs until reaching the limited acceleration ($a_{limit}$). Here, the object of the actual acceleration limitation may be to limit the acceleration change of the vehicle according to the acceleration/deceleration intention expressed by the driver's pedal operation. Accordingly, it is possible to secure the response performance and the climbing start performance of the vehicle by preventing the torque correction from occurring until the limited acceleration is reached through the acceleration limit.

First, the driving source recognition unit 111 may obtain a driving score of the driver. For example, the driving score recognition unit 111 may retrieve pre-stored driver information, which may include the driver's ID directly input by the driver, the driving mode, and the driver's driving score determined last before starting current driving of the vehicle. Here, the driving score recovery unit 111 may retrieve the driver's driving score determined last before starting the current driving for the driver to compare the driving score determined last before starting the current driving with the driving score currently determined. Before the start of driving, it may also be possible to retrieve the acceleration limit level set during the last driving for the acceleration limit setting unit 114 to determine whether to change the preset acceleration limit level according to the change amount in the driving score. Furthermore, the acceleration limit setting unit 114 may change the acceleration limit level in a stepwise manner through by comparing the prestored driving score and the current driving score. If there is no pre-stored driving score information, the driving score recognition unit 111 may use a preset default driving score or an initial driving score obtained by applying the driving score increase/decrease determined by the driving score calculation unit 112, which will be described later, to the default driving score.

It may also be possible for the driving score calculation unit 112 to determine the change amount of the driver's driving score based on the traveling information measured or generated while driving the vehicle. The change amount of the driving score may be determined as an increase or a decrease based on the traveling information. It may also be possible for the determination to be made in a way of increasing the driving score when the driving behavior is determined as being in a good way based on the measured or generated traveling information or in a way of decreasing the driving score when the driving behavior is determined as being not in a good way. The specific driving score increase or decrease may vary depending on traveling information, and detailed description thereof is made later with reference to FIG. 3, FIG. 4, and FIG. 5.

If the driving score calculation unit 112 determines the driving score variation, this may mean that the traveling information is of a driver who is not familiar with a new vehicle or who is inexperienced in driving itself. In the instant case, the driving score calculation unit 112 may perform determination based on the traveling information input to the VCU, and the traveling information may include at least one of vehicle speed information, regulation speed information, front vehicle distance information, Accelerator Pedal Sensor (APS) information, Brake Pedal Sensor (BPS) information, Steering Angle Sensor (SAS) information, and information on torque limited by an acceleration limit.

In detail, the APS information and BPS information, respectively refer to the degree of change in the accelerator pedal sensor and the brake pedal sensor of the vehicle, and the SAS information refers to the degree of change in the steering angle sensor of the vehicle. In the instant case, the driving score change amount may be determined only with a single factor among a plurality of factors forming the traveling information, or in consideration of the plurality of factors comprehensively. Furthermore, it is preferable to sum the driving score change amount based on the measured or generated traveling information and to multiply the driving score change amount based on the driver's vehicle mileage information to amplify the change rate as the mileage increases.

Figure 3:
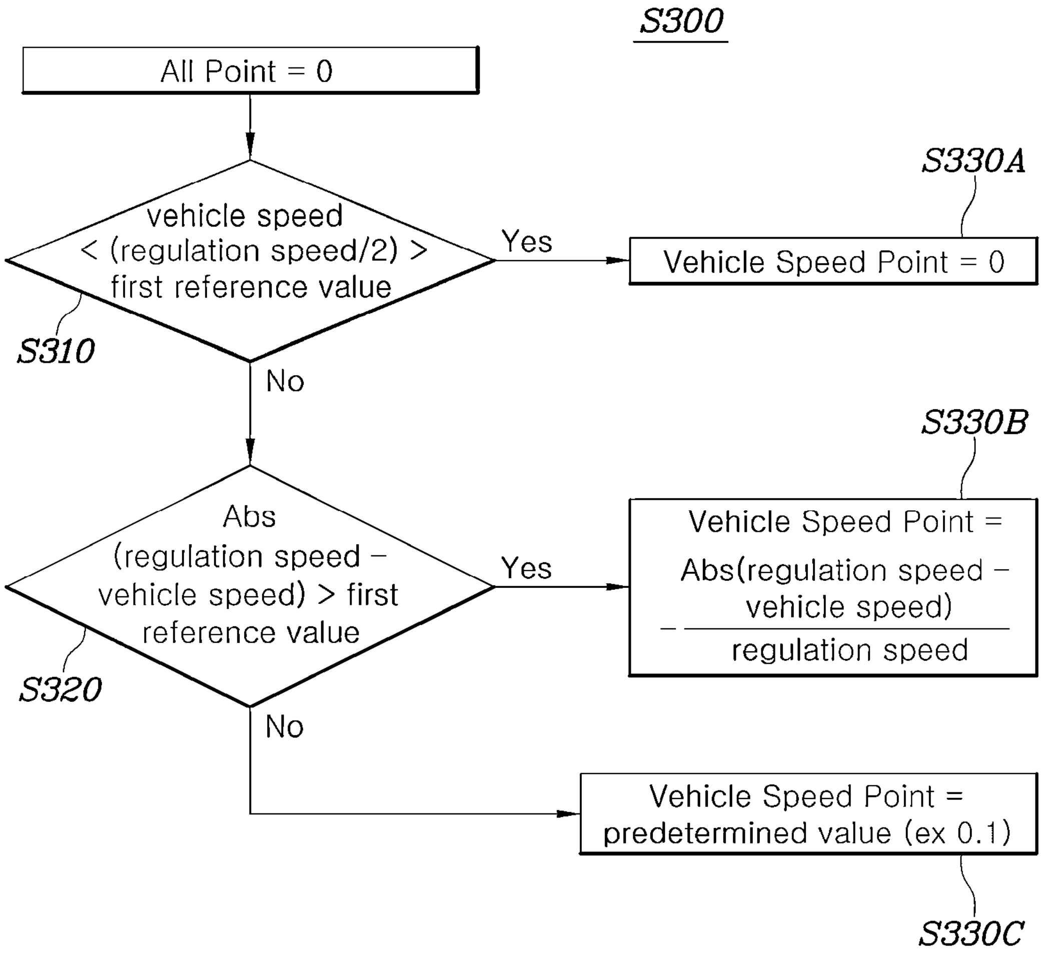
FIG. 3 is a flowchart illustrating a driving score determination method depicted in FIG. 2.

In more detail, as shown in FIG. 3, the driving score decreases when the difference between the vehicle speed and the regulation speed is large. This means that the reduction amount of the driving score increases to indicate the increase of the danger decree in relation with other vehicles while driving as the difference between the vehicle speed and the regulation speed increases. In FIG. 3, whether the difference between the vehicle speed and the regulation speed is large may be determined based on whether the vehicle speed under the driver's driving is less than ½ of the regulation speed. Here, ½ of the regulation speed is an exemplary reference which is not fixed but variable. When it is determined that the driving vehicle speed of the driver is greater than ½ of the regulation speed, it may be possible to decrease or increase the driving score according to whether the absolute value of the value obtained by subtracting the vehicle speed from the regulation speed exceeds the first reference value.

However, considering that the difference between vehicle speed and regulation speed may be large when starting or turning after stopping, it may be possible for the driving score calculation unit 112 to perform correction such as decreasing the score reduction amount, when determining the driving score change amount, in the corresponding situation.

Figure 4:
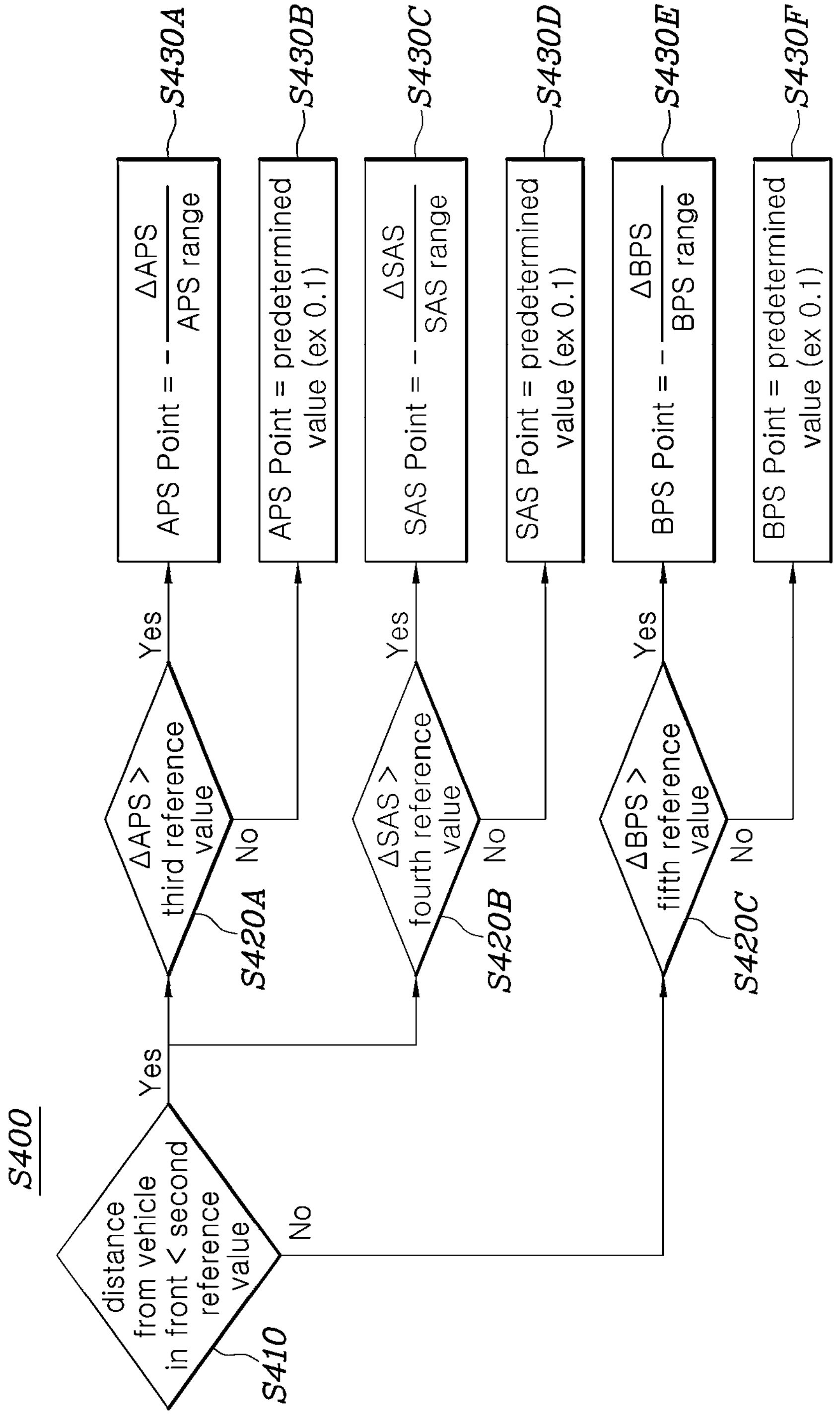
FIG. 4 and FIG. 5 are flowcharts illustrating a method for determining change amount in driving score of a driver based on the driving information depicted in FIG. 2.

As shown in FIG. 4, when the change amount in the APS or SAS is rapid while the distance from the front vehicle is close, the risk of collision with the vehicle in front increases. Accordingly, if the change amount in APS or SAS is rapid when the distance to the vehicle in front is close, this may be determined as a dangerous situation in which the possibility of collision with the vehicle in front increases and thus the driving score should be decreased. Here, whether the distance from the vehicle in front is close may be determined based on the second reference value, and the second reference value may be changed according to the driving conditions.

Conversely, if the change amount in BPS is abrupt in a state where the distance from the vehicle in front is not close, the risk of collision with the vehicle in front increases. Accordingly, if the change amount in BPS is abrupt when the distance between the driving vehicle and the rear vehicle is not close, this may be determined as a dangerous situation in which the possibility of collision with the rear vehicle increases and thus the driving score should be decreased.

Similar to the relationship between the vehicle speed and regulation speed, as the change amount in APS, SAS, or BPS rapidly increases, the possibility of collision with the vehicle in front or rear increases and the degree of danger increases, which means that the reduction amount of the driving score should be increased. Here, whether the among of change in APS, SAS, or BPS is rapid in degree may be determined based on the third reference value, the fourth reference value or the fifth reference value, and the reference values may each be changed according to the driving conditions.

Figure 5:
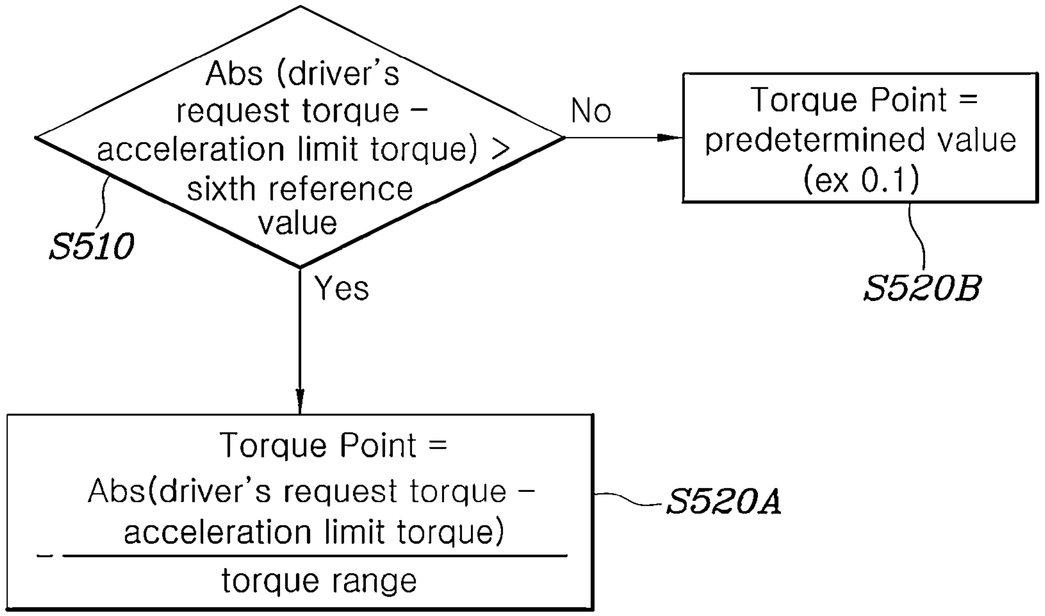

Also, as shown in FIG. 5, the driving score decreases as the torque amount limited by the acceleration limit increases. The torque amount limited by the acceleration limit corresponds to the value obtained by subtracting the acceleration limit torque limited by the preset acceleration limit level from the driver's request torque requested by the driver through the APS. As the amount of torque limited by the acceleration limit increases, this means that the driving behavior is not good compared to the acceleration limit level corresponding to the previously stored driving score of the driver, so that the driving score should be reduced. Here, whether the torque amount limited by the acceleration limit is large may be determined based on the sixth reference value, and the sixth reference value may be changed according to the driving situation.

In the case where a situation in which the driving score decreases does not correspond to one of the situation described so far, the driving score increases to a predetermined value.

Meanwhile, the driving score notification unit 120 may display the change amount of the driving score to the driver in a form of a notification. The driving score notification unit 120 may display the change amount of the driving score in a form of a notification through a cluster or AVN at regular intervals or display the change of the driving score and the reason in a form of notification with voice or text for the driver to recognize when the driving score change is large. For example, when the difference between the vehicle speed and the regulation speed is large, it may be possible to notify that the driving score decreases due to non-compliance with the regulation speed. It may also be possible, when the change amount in APS or SAS is abrupt, to notify that the driving score decreases due to intimidation to surrounding vehicles. Conversely, it may be possible, when the change in BPS is smooth, to notify that the driving score increases due to the smooth deceleration. Finally, it may also be possible, when the vehicle is accelerated according to the preset acceleration limit level, to notify that the driving score increases due to the smooth acceleration.

This allows the driver not only to recognize the change in driver's driving score but, when the driving score increases, also to gain a sense of achievement, resulting in a virtuous cycle in which the driver strives to learn a better driving behavior.

Also, the driving score determining unit 113 may determine a current driving score based on the determined driving score change amount and the obtained driving score. The change amount in driving score with decrease or increase which is determined based on traveling information is simply summed with the obtained driving score so that the acceleration limit setting unit 114 sets the acceleration limit level based on the summed driving score according to the predetermined standard.

The acceleration limit setting unit 114 may set the acceleration limit level or change a preset acceleration limit level to limit acceleration of the vehicle in a stepwise manner based on the determined current driving score. Here, the acceleration subject to the limitation may be an acceleration corresponding to a vehicle speed changed by the driver's pedal operation (i.e., a torque required according to the APS, a required braking force according to the BPS, etc.), but is not necessarily limited thereto. For example, even when acceleration/deceleration control such as smart cruise control is performed by the VCU, the acceleration limit according to the exemplary embodiment of the present disclosure may be applied. The acceleration limit setting unit 114 may receive the driver's acceleration intention information and the surrounding road condition information from the acceleration intention determination unit 116 for determining the driver's intention to accelerate and the road situation determination unit 117 for determining the surrounding road condition while driving, respectively. In the present manner, it may be possible to set the acceleration limit level or change the preset acceleration limit level in comprehensive consideration of the determined current driving score, the driver's intention to accelerate, and the road condition. Here, the acceleration limit setting unit 114 may increase or decrease the acceleration limit level according to the driver's acceleration intention determined based on how much the driver presses the accelerator pedal. When it is determined that the road condition is not good, the acceleration limit level is increased to actively assist a beginner driver who is inexperienced in driving.

In the acceleration limit setting unit 114, it may be possible to change the driving score-based acceleration limit level by combining one or more of the following. First, when a driver with a low driving score selects the active assistance of the VCU by himself/herself, it may be possible to increase the acceleration limit level to enable smooth acceleration. Second, it may be possible to decrease the acceleration level as the driving score increases. Third, it may be possible to divide the acceleration limit level into driving score ranges for each level. Accordingly, the acceleration limit setting unit 114 may change the acceleration limit level to decrease when the determined current driving score is greater than a driving score of the preset acceleration limit level and to increase when the current driving score is equal to or less than the driving score of the preset acceleration limit level. For example, the acceleration limit level may be set to 4 in a section of 40 to 60 driving scores. If the determined current driving score differs from a score corresponding to a range two-level higher than the preset acceleration limit level, it may be possible to change the acceleration limit level by two or more levels.

Finally, the change range of the acceleration limit level may be determined based on the change amount in the driving score. Accordingly, the acceleration limit setting unit 114 may determine and change the acceleration limit level when the determined change in driving score exceeds the driving score range of the preset acceleration limit level. For example, when the driving score decreases by 30 points at a time in the case where 30 points are wider than the driving score range of the acceleration limit level divided by level, it may be possible to change the acceleration limit level by a plurality of levels at once depending on the range.

In the acceleration limit setting unit 114, it may also be possible to change the period of changing the acceleration limit level by combining one or more of the following. First, the changed acceleration limit level may be applied to the driver's next driving based on the driver's current driving result. Second, when it is determined to increase the acceleration limit level is increased, it is applied immediately; when it is determined to decrease the acceleration limit level, it may be applied during the driver's next driving. Finally, when it is determined to change the acceleration limit level, it may be applied immediately.

Also, the driving score storage unit 115 may store the determined driving score of the current driver after driving the vehicle is finished. It may be possible to store the current driver's driving score determined when the driver's current driving is ended or after the current vehicle driving is finished so that the stored driver's driving score may be retrieved and used in determining the next driving score for the driver's next driving. In the instant case, when there is a plurality of drivers driving the vehicle, the driving scores of the plurality of drivers may be individually stored.

Figure 2:
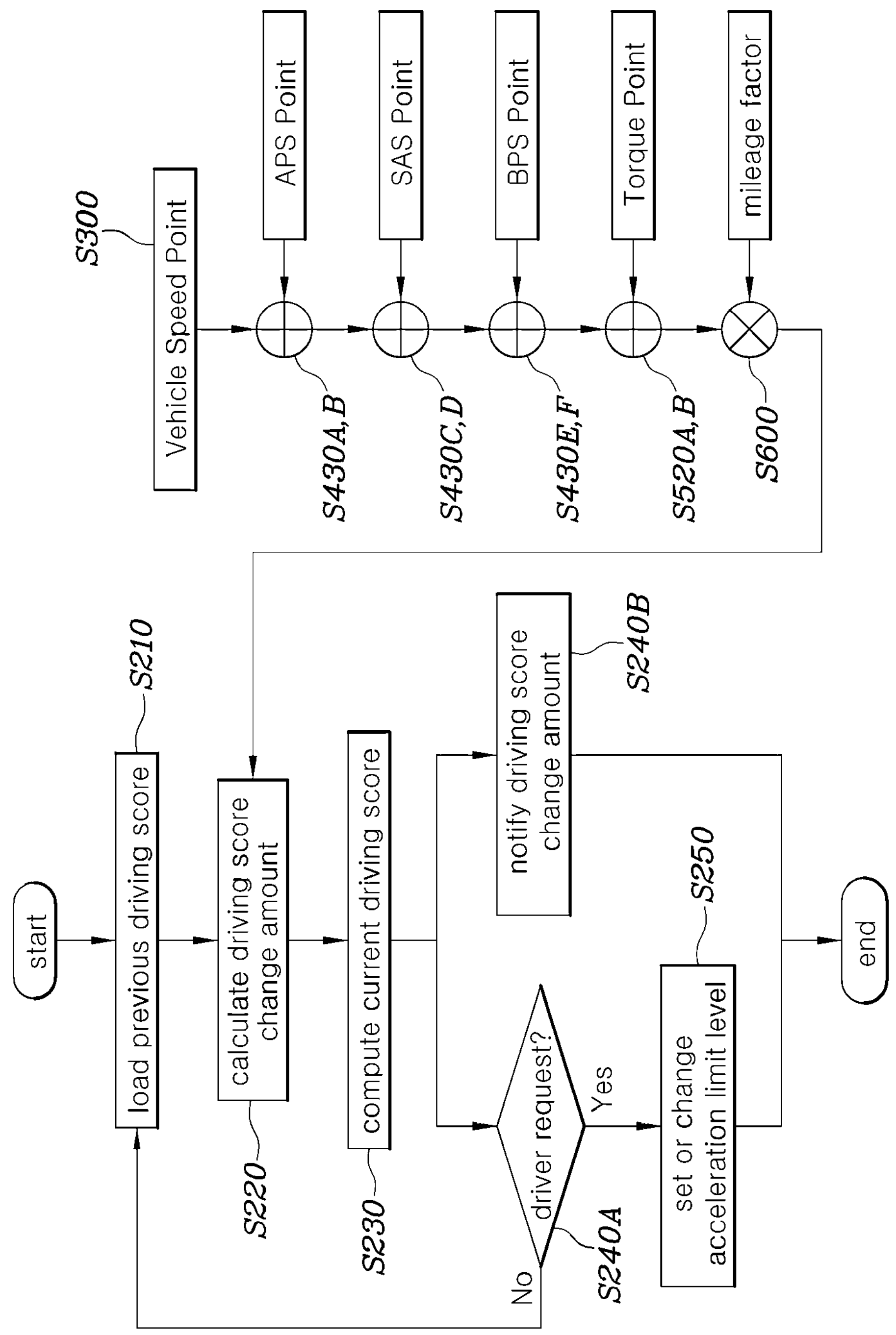
FIG. 2 is a flowchart illustrating an operation of an acceleration limit control method of a vehicle according to various exemplary embodiments of the present disclosure.

A description includes the acceleration limit control method of the vehicle 100 according to an exemplary embodiment of the present disclosure, with reference to FIG. 2, based on the above-described configuration of the vehicle 100.

FIG. 2 is a flowchart illustrating an acceleration limit control method of the vehicle 100 according to various exemplary embodiments of the present disclosure. As shown in FIG. 2, it may be possible to obtain a driving score of a driver at step S210. Next, it may be possible to determine, at step S220, the change amount in the driver's driving score based on the traveling information measured or generated during the vehicle driving. When determining the driving score change amount, the driving score change amount based on the traveling information measured or generated is summed (S430A-S430F, S520A, S520B), and the driving score change amount based on the driver's vehicle mileage information is multiplied to amplify the change rate of the driving score as the mileage increases.

At step S230, the current driving score is determined based on the determined driving score change amount and obtained driving score.

Next, it may be possible to, when there is an active assistance request from the VCU of the driver (YES at S240A), to set an acceleration limit level or change a preset acceleration level at step S250 to limit acceleration of the vehicle by the driver's pedal operation in a stepwise manner based on the determined current driving score. When there is no active assistance request from the driver's VCU (NO at S240A), it may be possible to obtain the driver's driving score again at step S210 without setting the acceleration limit level or changing the preset acceleration limit level.

It may also be possible to display, at step S240B, the driving score change amount at regular intervals in the form of a notification or, when the change in driving score is large, the change of the driving score and the reason in the form of a notification with voice or text for the driver to recognize.

FIG. 3 is a flowchart illustrating a driving score determination method depicted in FIG. 2; and a description is made in detail of the driving score determination method based on the determination of the above-described driving vehicle speed of the driver and regulation speed. First, it may be possible to set the initial driving score to 0 and determine at step S310 whether the driving vehicle speed of the driver is greater than ½ of the regulation speed. If it is determined that the driving vehicle speed of the driver is less than ½ of the regulation speed (YES at S310), the change amount of the driving score based on the vehicle speed and the regulation speed is 0 at step S330A.

Otherwise, if it is determined that the driving vehicle speed of the driver is greater than ½ of the regulation speed (NO at S310), it may be possible to determine at step S320 whether the absolute value of a value obtained by subtracting the vehicle speed from the regulation speed is greater than the first reference value. If it is determined that the absolute value of the value obtained by subtracting the vehicle speed from the regulation speed is greater than the first reference value (YES at S320), it may be possible to decrease, at step S330B, the driving score by (regulation speed-vehicle speed)/(regulation speed) from the pre-stored driving score. Otherwise, if it is determined that the absolute value of the value obtained by subtracting the vehicle speed from the regulation speed is equal to or less than the first reference value (NO at S320), it may be possible to increase, at step S330C, the driving score by a predetermined value from the pre-stored driving score. Here, the predetermined value is not a fixed one but may vary according to the driving condition of the vehicle.

FIG. 4 and FIG. 5 are flowcharts illustrating a method for determining change amount in driving score of a driver based on the driving information depicted in FIG. 2. A description is made in detail of the driving score determination method based on the above described change amount in APS, SAS, and BPS and the torque amount limited by the acceleration limit.

First, it may be possible to determine at step S410 whether the distance from the vehicle in front is less than a second reference value. If it is determined that the distance to the vehicle in front is less than the second reference value (YES at S410), it may be possible to independently determine at step S420A whether the change amount in APS is greater than a third reference value or at step S420B whether the change amount in APS is greater than a fourth reference value. If it is determined that the change amount in APS is greater than the third reference value (YES at S420A), it may be possible to decrease, at step S430A, the driving score by (the change amount in APS)/(range of APS) from the previously stored operation points. Otherwise, if it is determined that the change amount in the APS is not greater than the third reference value (NO at S420A), it may be possible to increase, at step S430B, the driving score by a predetermined value from the pre-stored operation score. Similarly, if it is determined that the change amount in the SAS is greater than the fourth reference value (YES at S420B), it may be possible to decrease, at step S430C, the driving score by (variation amount of SAS)/(range of SAS) from the pre-stored driving score. Otherwise, if it is determined that the change amount in the SAS is not greater than the fourth reference value (NO at S420B), it may be possible to increase, at step S430D, the driving score by a predetermined value from the pre-stored driving score.

Meanwhile, if it is determined that the distance from the vehicle in front is equal to or greater than the second reference value (NO at S410), it may be possible to determine at step S420C whether the change amount in BPS is greater than the fifth reference value. If it is determined that the change amount in the BPS is greater than the fifth reference value (YES at S420C), it may be possible to decrease, at step S430E, the driving score by (the change amount in BPS)/(range of BPS) from the previously stored driving score. Otherwise, if it is determined that the change amount in the BPS is not greater than the fifth reference value (NO at S420C), it may be possible to increase, at step S430F, the driving score by a predetermined value from the pre-stored driving score.

Whether the degree of change in APS, SAS, or BPS is abrupt may be determined based on the third reference value, the fourth reference value, or the fifth reference value, respectively, and each reference value may vary according to driving conditions.

It may also be possible to determine at step S510 whether the absolute value of the value obtained by subtracting the acceleration limiting torque limited by the preset acceleration limiting level from the driver's requested torque is greater than a sixth reference value. If it is determined that the absolute value of the value obtained by subtracting the acceleration limiting torque limited by the preset acceleration limiting level from the driver's requested torque is greater than a sixth reference value (YES at S510), it may be possible to decrease, at step S5250A, the driving score by (absolute value of the value obtained by subtracting the acceleration limiting torque limited by the preset acceleration limiting level from the driver's requested torque/(torque range) from the pre-stored driving score. Otherwise, if it is determined that the absolute value of the value obtained by subtracting the acceleration limiting torque limited by the preset acceleration limiting level from the driver's requested torque is less than or equal to the sixth reference value (NO at S510), it may be possible to increase, at step S520B, the driving score by a predetermined value from the previously stored driving points.

According to the exemplary embodiments of the present disclosure described hereinabove, the driver's driving score determined based on the information generated and measured in the VCU is used to indicate whether the current driving behavior is in a good way or a bad way to be of great help to beginner drivers. Furthermore, even when a driver with a low driving score requests active assistance from the VCU, it is possible to increase the acceleration limit level to achieve smooth acceleration. Afterwards, if the acceleration limit level is lowered as the driving score increases, the driver can get a sense of achievement, resulting in a virtuous cycle in which the driver makes more efforts to learn a better driving method.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An acceleration limit control method of a vehicle, the method comprising:

obtaining a driving score of a driver in the vehicle;

determining a driving score change amount of the driver based on traveling information measured or generated when the vehicle is driving;

determining a current driving score based on the determined driving score change amount and the obtained driving score;

setting an acceleration limit level or changing a preset acceleration limit level based on the determined current driving score;

outputting limited acceleration by a vehicle control unit (VCU) according to the acceleration limit level set or changed, to actually limit acceleration by the acceleration limit device; and wherein the determining of the current driving score includes adjusting the current driving score based on sensor information or torque amount information limited by the acceleration limit.

2. The method of claim 1, wherein the sensor information includes vehicle speed data, and wherein the adjusting includes adjusting the current driving score based on a difference between a regulation speed and the vehicle speed.

3. The method of claim 2, wherein the adjusting the current driving score based on the difference includes adjusting the current driving score by decreasing the current driving score by a ratio between the difference and the regulation speed when an absolute value of the difference is greater than a predetermined first reference value.

4. The method of claim 2, wherein the adjusting the current driving score based on the difference includes adjusting the current driving score by increasing the current driving score by a value depending on a driving situation of the vehicle, when an absolute value of the difference is less than or equal to a predetermined first reference value.

5. The method of claim 1, wherein the sensor information includes Accelerator Pedal Sensor (APS) data, and wherein the adjusting includes adjusting the current driving score based on a change amount in the APS when a distance from a vehicle in front is less than a predetermined second reference value.

6. The method of claim 5, wherein the adjusting the current driving score based on the change amount in the APS includes adjusting the current driving score by decreasing the current driving score by a ratio between the change amount in the APS and a range of APS when the change amount in the APS is greater than a predetermined third reference value.

7. The method of claim 5, wherein the adjusting the current driving score based on the change amount in the APS includes adjusting the current driving score by increasing the current driving score by a value depending on a driving situation of the vehicle, when the change amount in the APS is less than or equal to a predetermined third reference value.

8. The method of claim 1, wherein the sensor information includes Steering Angle Sensor (SAS) data, and wherein the adjusting includes adjusting the current driving score based on a change amount in the SAS when a distance from a vehicle in front is less than a predetermined second reference value.

9. The method of claim 8, wherein the adjusting the current driving score based on the change amount in the SAS includes adjusting the current driving score by decreasing the current driving score by a ratio between the change amount in the SAS and a range of SAS when the change amount in the SAS is greater than a predetermined fourth reference value.

10. The method of claim 8, wherein the adjusting the current driving score based on the change amount in the SAS includes adjusting the current driving score by increasing the current driving score by a value depending on a driving situation of the vehicle, when the change amount in the SAS is less than or equal to a predetermined fourth reference value.

11. The method of claim 1, wherein the sensor information includes Brake Pedal Sensor (BPS) data, and wherein the adjusting includes adjusting the current driving score based on a change amount in the BPS when a distance from a vehicle in front is greater than or equal to a predetermined second reference value.

12. The method of claim 11, wherein the adjusting the current driving score based on the change amount in the BPS includes adjusting the current driving score by decreasing the current driving score by a ratio between the change amount in the BPS and a range of BPS when the change amount in the BPS is greater than a predetermined fifth reference value.

13. The method of claim 11, wherein the adjusting the current driving score based on the change amount in the BPS includes adjusting the current driving score by increasing the current driving score by a value depending on a driving situation of the vehicle, when the change amount in the BPS is less than or equal to a predetermined fifth reference value.

14. The method of claim 1, wherein the adjusting includes adjusting the current driving score based on a difference between a driver's request torque and an acceleration limiting torque limited by the preset acceleration limiting level.

15. The method of claim 14, wherein the adjusting the current driving score based on the difference includes adjusting the current driving score by decreasing the current driving score by a ratio between the difference and a torque range when an absolute value of the difference is greater than a predetermined sixth reference value.

16. The method of claim 14, wherein the adjusting the current driving score based on the difference includes adjusting the current driving score by increasing the current driving score by a value depending on a driving situation of the vehicle, when an absolute value of the difference is less than or equal to a predetermined sixth reference value.

* * * * *